United States Patent
Madan et al.

(10) Patent No.: US 9,084,241 B2
(45) Date of Patent: Jul. 14, 2015

(54) METHODS AND APPARATUS FOR DETERMINING AVAILABLE RESOURCES FOR D2D COMMUNICATIONS

(75) Inventors: Ritesh K. Madan, Jersey City, NJ (US); Saurabh Tavildar, Jersey City, NJ (US); Cyril Measson, Somerville, NJ (US)

(73) Assignee: QUALCOMM Incorporated, San Diego, CA (US)

(*) Notice: Subject to any disclaimer, the term of this patent is extended or adjusted under 35 U.S.C. 154(b) by 485 days.

(21) Appl. No.: 13/476,505

(22) Filed: May 21, 2012

(65) Prior Publication Data

US 2013/0308551 A1    Nov. 21, 2013

(51) Int. Cl.
*H04W 72/04* (2009.01)
*H04W 76/02* (2009.01)

(52) U.S. Cl.
CPC ........ *H04W 72/0406* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 2010/0009675 A1* | 1/2010 | Wijting et al. | 455/426.1 |
| 2010/0255852 A1 | 10/2010 | Chen et al. | |
| 2011/0106952 A1 | 5/2011 | Doppler et al. | |
| 2012/0117155 A1 | 5/2012 | Li et al. | |
| 2013/0150051 A1* | 6/2013 | Van Phan et al. | 455/437 |
| 2013/0157679 A1* | 6/2013 | Van Phan et al. | 455/452.2 |
| 2013/0188546 A1* | 7/2013 | Turtinen et al. | 370/312 |
| 2014/0038653 A1* | 2/2014 | Mildh et al. | 455/501 |
| 2014/0256334 A1* | 9/2014 | Kazmi et al. | 455/450 |
| 2014/0274066 A1 | 9/2014 | Fodor et al. | |

FOREIGN PATENT DOCUMENTS

| | | |
|---|---|---|
| WO | 2011050519 A1 | 5/2011 |
| WO | 2011069295 A1 | 6/2011 |
| WO | 2011088619 A1 | 7/2011 |
| WO | 2011124015 A1 | 10/2011 |
| WO | 2012019349 A1 | 2/2012 |

(Continued)

OTHER PUBLICATIONS

Janis, et al., "Device-to-Device Communication Underlaying Cellular Communications Systems," Int. J. Communications, Network and System Sciences, 2009, pp. 169-247, vol. 3.

(Continued)

*Primary Examiner* — Yemane Mesfin
*Assistant Examiner* — Peter Chen
(74) *Attorney, Agent, or Firm* — James K. O'Hare

(57) ABSTRACT

A method, an apparatus, and a computer program product for wireless communication are provided in which a first eNB may be operable to determine a set of resources to allocate for D2D communications based on one or more network factors and transmit the set of resources allocated for D2D communications. A first UE may receive the set of resources allocated for D2D communications. A second UE may inform the first UE of a set of resources allocated for D2D communications by a second eNB. The first UE may determine a subset of resources to use for D2D communications with a second UE based on one or more D2D resource determination schemes, and may signal the determined subset to the first eNB. The first eNB may receive the subset of resources and transmit a control signal indicating that the subset of resources has been allocated for D2D communications.

36 Claims, 17 Drawing Sheets

(56) References Cited

FOREIGN PATENT DOCUMENTS

| WO | WO-2012016378 A1 | 2/2012 |
| WO | 2012144941 A1 | 10/2012 |

OTHER PUBLICATIONS

Tao Peng et al., "Interference avoidance mechanisms in the hybrid cellular and device-to-device systems", IEEE 20th International Symposium on Personal, Indoor and Mobile Radio Communications (PIMRC 2009), IEEE, Piscataway, NJ, USA, Sep. 13, 2009, pp. 617-621, XP031659660, ISBN: 978-1-4244-5122-7 abstract, chapters I, II, III.

Zheng, et al., "Radio Resource Allocation in LTE-Advanced Cellular Networks with M2M Communications" Retrieved on Oct. 13, 2011 from the Internet at http://www.cttc.es/resources/doc/110330-m2m-ieeecomsmag-final-14964.pdf pp. 1-17.

International Search Report and Written Opinion—PCT/US2013/042048—ISA/EPO—Oct. 7, 2013.

\* cited by examiner

METHODS AND APPARATUS FOR DETERMINING AVAILABLE RESOURCES FOR D2D COMMUNICATIONS

BACKGROUND

1. Field

The present disclosure relates generally to communication systems, and more particularly, to a system to enable a user equipment (UE) to determine available resources for device to device (D2D) communication between a pair of devices.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

The wireless communications system may include a plurality UEs and a plurality of evolved NodeBs (eNBs). The UEs may be associated with difference eNBs and the eNBs may be associated with different cells. A first UE associated with a first eNB in a first cell and a second UE associated with a second eNB in a second cell may be operable to communicate directly with each other using resources allocated for D2D communications. Devices in neighboring cells may be allocated different sets of resources for D2D communication. As such, a method and apparatus for determining available resources for D2D communication between UEs associated with different eNBs is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with determining D2D communication resource availability in an environment supported by multiple eNBs. In one example, a first eNB may be operable to determine a set of resources to allocate for D2D communications based on one or more network factors and transmit the set of resources allocated for D2D communications. A first UE may be equipped to receive a control signal indicating a set of resources allocated for D2D communications by a first eNB. A second UE may inform the first UE of a set of resources allocated for D2D communications by a second eNB. The UE may be equipped to determine a subset of resources to use for D2D communications with a second UE based on one or more D2D resource determination schemes, and may signal the determined subset to the first eNB. The first eNB may receive the subset of resources selected by a UE and transmit a control signal indicating that the subset of resources has been allocated for use during D2D communications.

According to related aspects, a method for determining D2D communication resource availability in an environment supported by multiple eNBs is provided. The method can include receiving, by a first UE, a control signal indicating a set of resources allocated for D2D communications by a first eNB. Further, the method may include determining a subset of resources to use for D2D communications with a second UE based on one or more D2D resource determination schemes. In one aspect, at least a portion of a set of resources allocated for D2D communications by a second eNB for use by the second UE may be different than the set of resources allocated for D2D communications by the first eNB. Further, the method may include signaling the determined subset of resources to the first eNB. Moreover, the method can include receiving an identifier, over a control channel, indicating the subset of resources for use during D2D communications over a shared channel.

Another aspect relates to a wireless communications apparatus. The wireless communications apparatus can include means for receiving, by a first UE, a control signal indicating a set of resources allocated for D2D communications by a first eNB. Further, the wireless communications apparatus can include means for determining a subset of resources to use for D2D communications with a second UE based on one or more D2D resource determination schemes. In one aspect, at least a portion of a set of resources allocated for D2D communications by a second eNB for use by the second UE may be different than the set of resources allocated for D2D communications by the first eNB. Further, the wireless communications apparatus can include means for signaling the determined subset of resources to the first eNB. Moreover, the wireless communications apparatus can include means for receiving an identifier, over a control channel, indicating the subset of resources for use during D2D communications over a shared channel.

Another aspect relates to a wireless communications apparatus. The apparatus can include a processing system configured to receive a control signal indicating a set of resources allocated for D2D communications by a first eNB. Further, the processing system may be configured to determine a subset of resources to use for D2D communications with a second UE based on one or more D2D resource determination schemes. In one aspect, at least a portion of a set of resources allocated for D2D communications by a second eNB for use by the second UE may be different than the set of resources allocated for D2D communications by the first eNB. Further, the processing system may be configured to signal the determined subset of resources to the first eNB. Moreover, the processing system may be configured to receive an identifier, over a control channel, indicating the subset of resources for use during D2D communications over a shared channel.

Another aspect relates to a computer program product, which can have a computer-readable medium comprising code for receiving, by a first UE, a control signal indicating a set of resources allocated for D2D communications by a first eNB. Further, the computer-readable medium can include code for determining a subset of resources to use for D2D communications with a second UE based on one or more D2D resource determination schemes. In one aspect, at least a portion of a set of resources allocated for D2D communications by a second eNB for use by the second UE may be different than the set of resources allocated for D2D communications by the first eNB. Further, the computer-readable medium can include code for signaling the determined subset of resources to the first eNB. Moreover, the computer-readable medium can include code for receiving an identifier, over a control channel, indicating the subset of resources for use during D2D communications over a shared channel.

According to another related aspect, a method for determining D2D communication resource availability in an environment supported by multiple eNBs is provided. The method can include determining, by a first eNB, a set of resources to allocate for D2D communications based on one or more network factors. In one aspect, at least a portion of a set of resources allocated for D2D communications by a second eNB may be different than the set of resources allocated for D2D communications by the first eNB. Moreover, the method can include transmitting a control signal indicating the set of resources allocated for D2D communications.

Another aspect relates to a wireless communications apparatus. The wireless communications apparatus can include means for determining, by a first eNB, a set of resources to allocate for D2D communications based on one or more network factors. In one aspect, at least a portion of a set of resources allocated for D2D communications by a second eNB may be different than the set of resources allocated for D2D communications by the first eNB. Moreover, the wireless communications apparatus can include means for transmitting a control signal indicating the set of resources allocated for D2D communications.

Another aspect relates to a wireless communications apparatus. The apparatus can include a processing system configured to determine a set of resources to allocate for D2D communications based on one or more network factors. In one aspect, at least a portion of a set of resources allocated for D2D communications by a second eNB may be different than the set of resources allocated for D2D communications by a first eNB. Moreover, the processing system may be configured to transmit a control signal indicating the set of resources allocated for D2D communications.

Another aspect relates to a computer program product, which can have a computer-readable medium comprising code for determining, by a first eNB, a set of resources to allocate for D2D communications based on one or more network factors. In one aspect, at least a portion of a set of resources allocated for D2D communications by a second eNB may be different than the set of resources allocated for D2D communications by the first eNB. Moreover, the computer-readable medium can include code for transmitting a control signal indicating the set of resources allocated for D2D communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
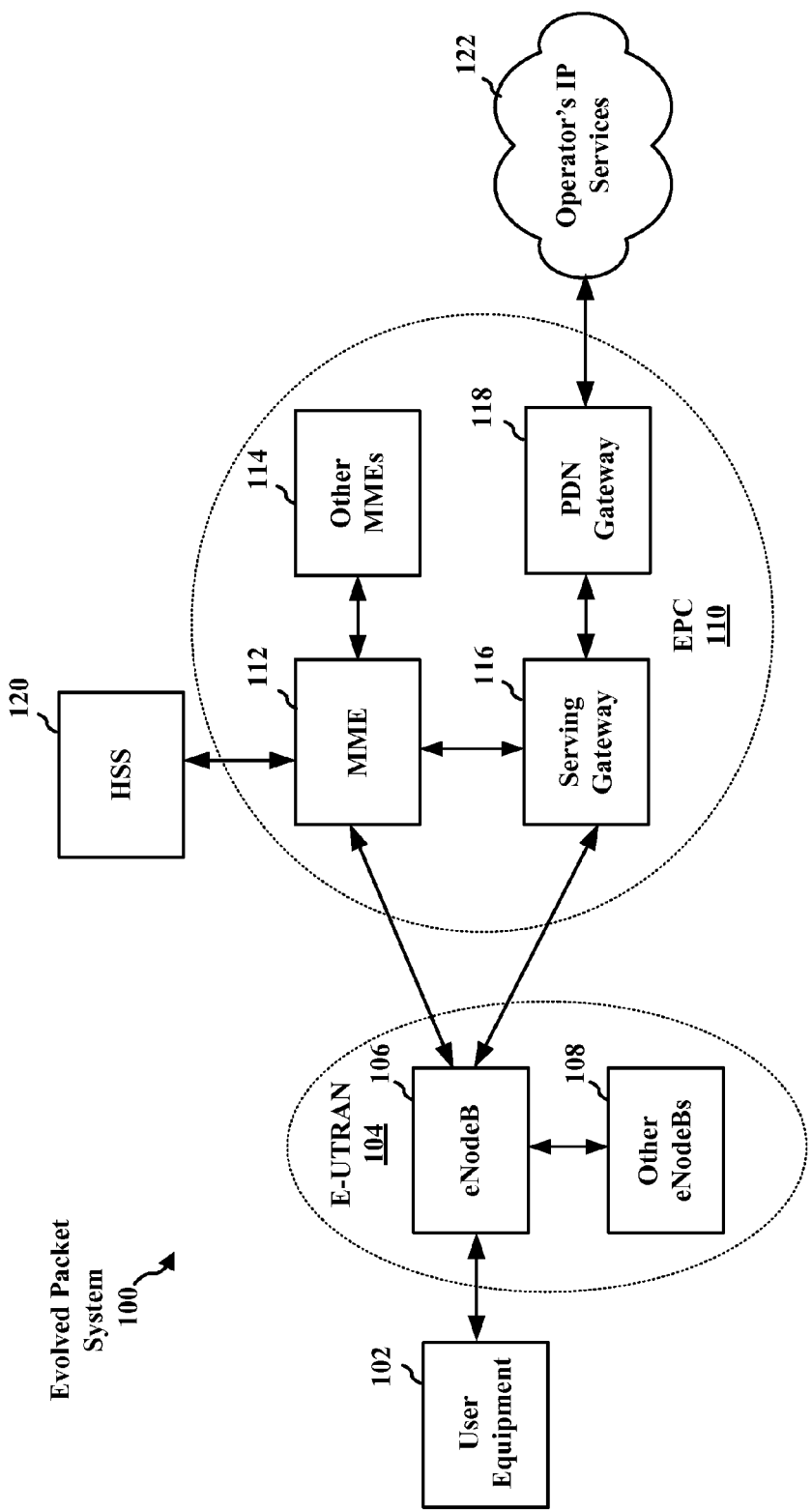
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
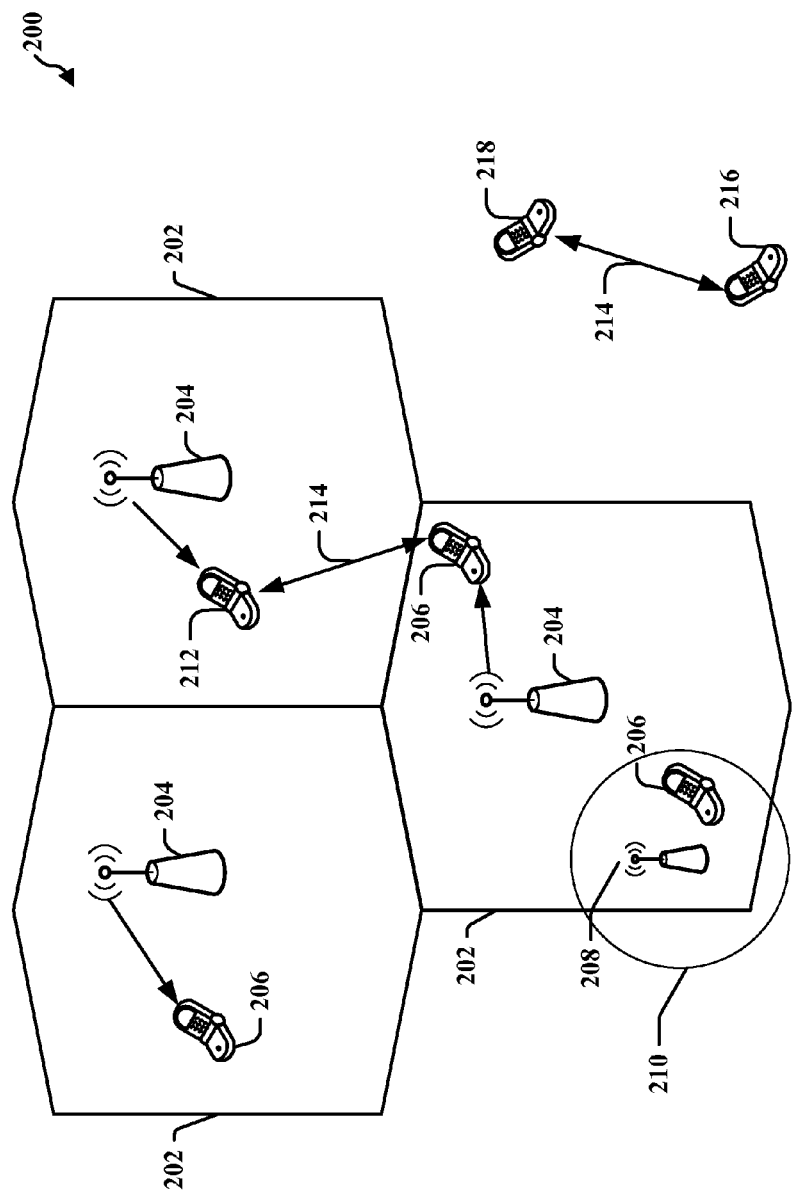
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

Further, some of the wireless devices 206, 212, 216, 218 may communicate together in peer-to-peer communication 214, some may communicate with the base station 204, and some may do both. For example, as shown in FIG. 2, the wireless devices 216, 218 may be in peer-to-peer communication 214 and the wireless devices 206, 212 may be in peer-to-peer communication 214. The wireless devices 206, 212 may also be in communication with the base station 204.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
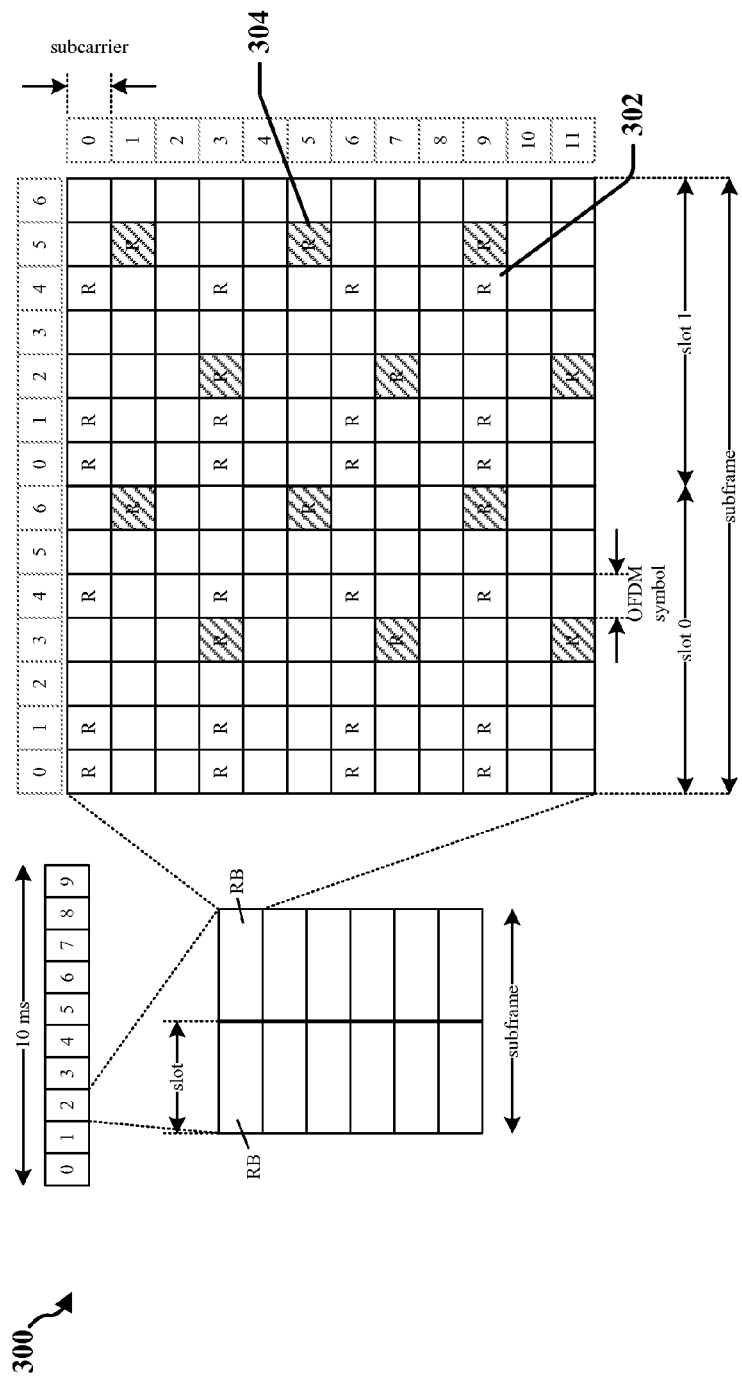
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
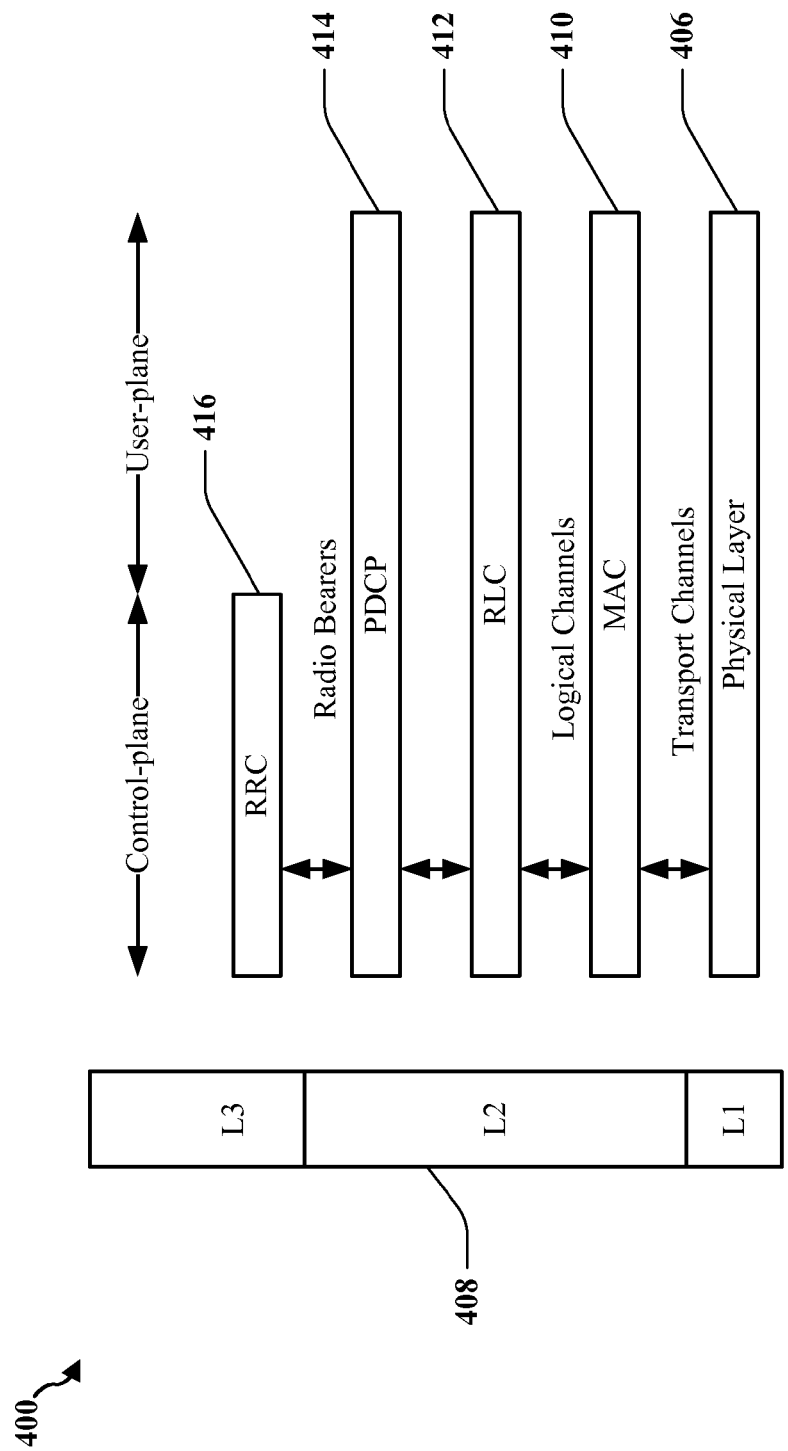
FIG. 4 is a diagram illustrating an example of a radio protocol architecture for the user and control planes.

FIG. 4 is a diagram 400 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 406. Layer 2 (L2 layer) 408 is above the physical layer 406 and is responsible for the link between the UE and eNB over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the eNB on the network side. Although not shown, the UE may have several upper layers above the L2 layer 408 including a network layer (e.g., IP layer) that is terminated at the PDN gateway 118 on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the control plane, the radio protocol architecture for the UE and eNB is substantially the same for the physical layer 406 and the L2 layer 408 with the exception that there is no header compression function for the control plane. The control plane also includes a radio resource control (RRC) sublayer 416 in Layer 3 (L3 layer). The RRC sublayer 416 is responsible for obtaining radio resources (i.e., radio bearers) and for configuring the lower layers using RRC signaling between the eNB and the UE.

Figure 5:
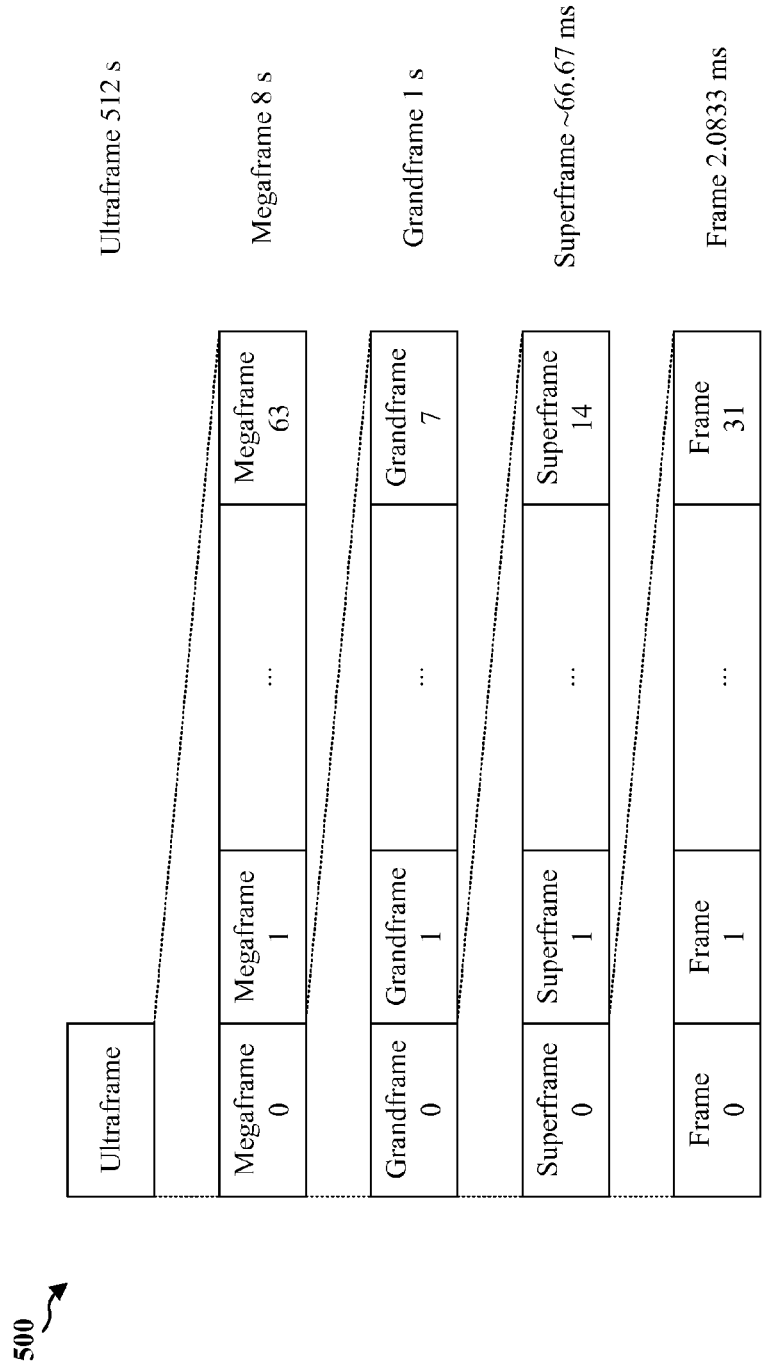
FIG. 5 is a diagram illustrating an exemplary time structure for peer-to-peer communication between the wireless devices.

FIG. 5 is a diagram 500 illustrating an exemplary time structure for peer-to-peer communication between the wireless devices. An ultraframe is 512 seconds and includes 64 megaframes. Each megaframe is eight seconds and includes eight grandframes. Each grandframe is one second and includes 15 superframes. Each superframe is approximately 66.67 ms and includes 32 frames. Each frame is 2.0833 ms.

Figure 6:
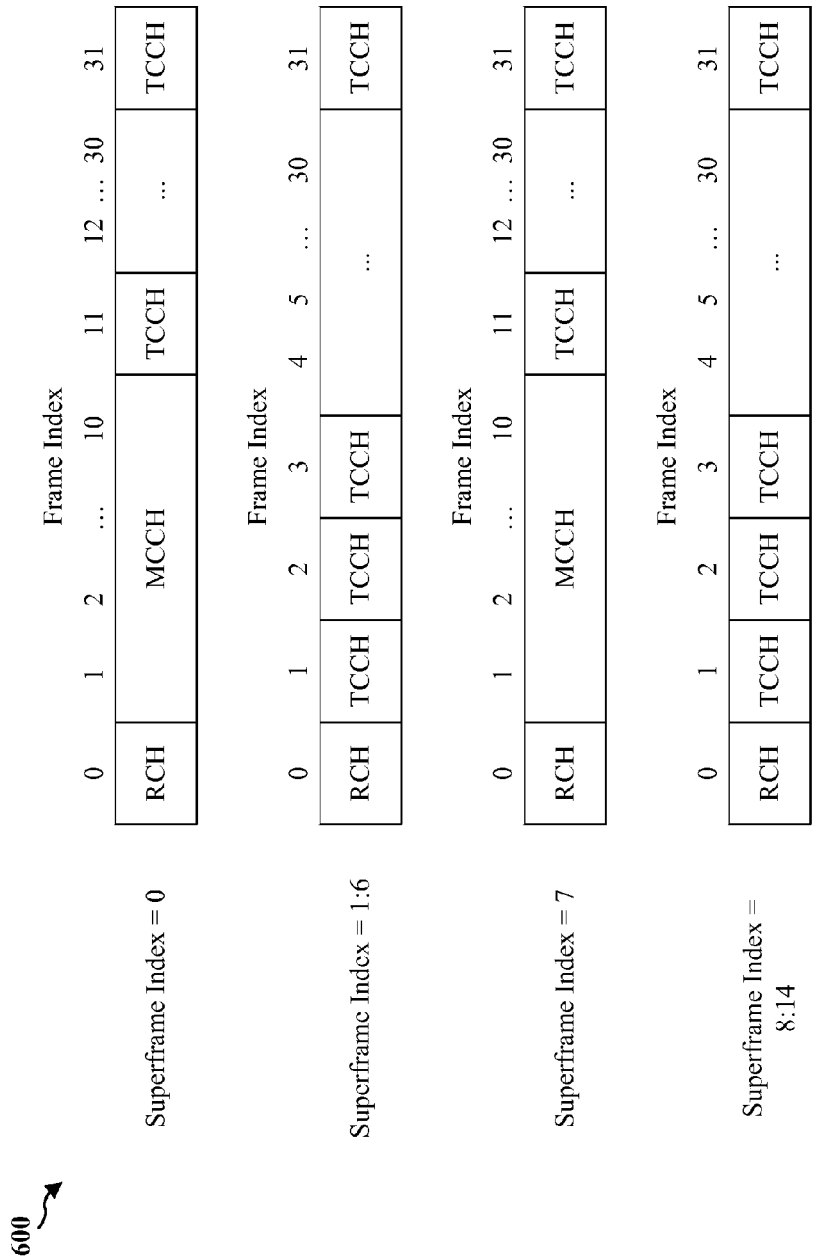
FIG. 6 is a diagram illustrating the channels in each frame of superframes in one grandframe.

FIG. 6 is a diagram 600 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the 2nd through 7th superframes (with index 1:6), frame 0 is a RCH and frames 1-31 are each a TCCH. In an 8th superframe (with index 7), frame 0 is a RCH, frames 1-10 are each a MCCH, and frames 11-31 are each a TCCH. In the 9th through 15th superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 7:
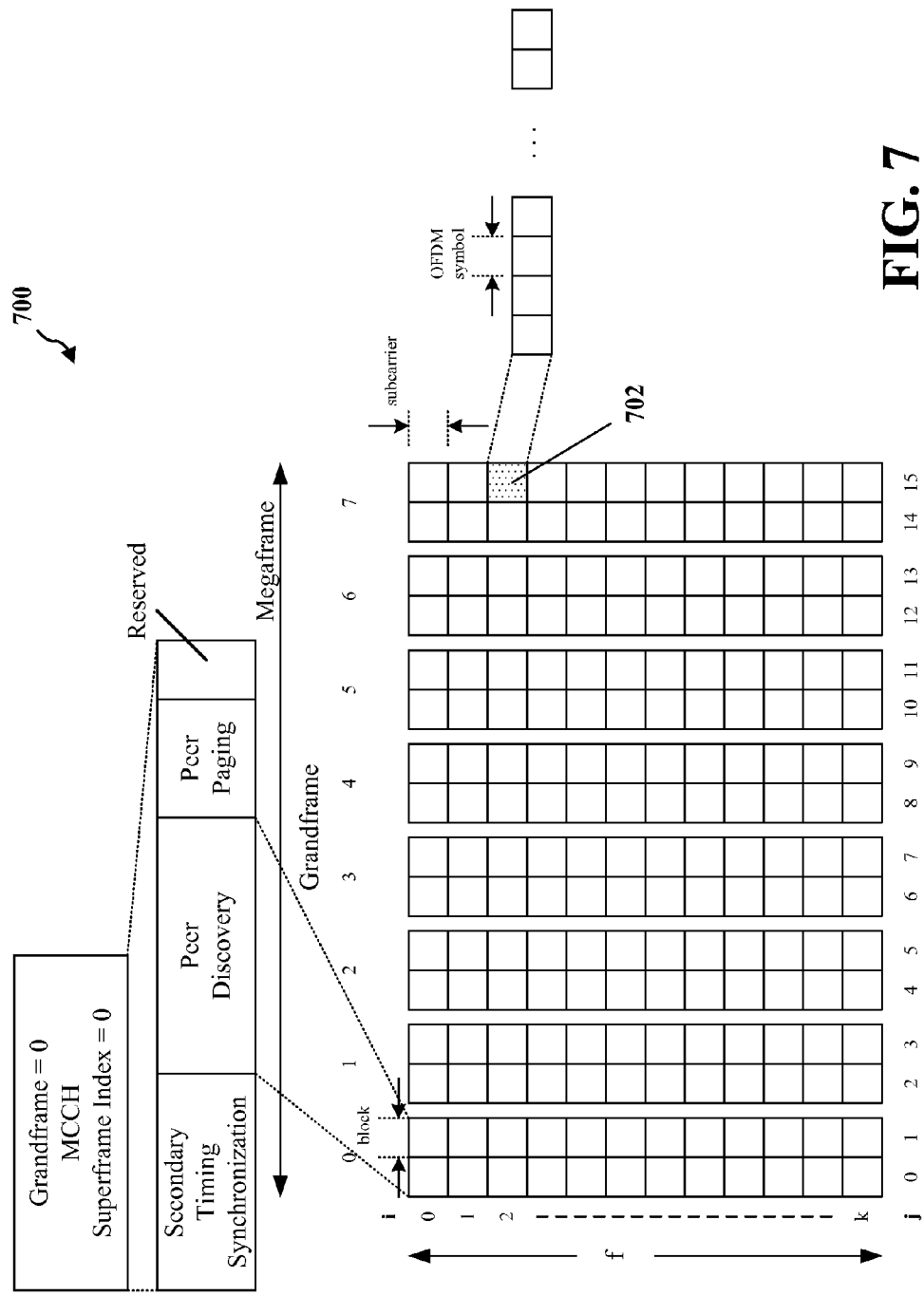
FIG. 7 is a diagram illustrating an operation timeline of a miscellaneous channel and a structure of a peer discovery channel.

FIG. 7 is a diagram 700 illustrating an operation timeline of the MCCH and an exemplary structure of a peer discovery channel. As discussed in relation to FIG. 6, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 7 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 702 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding to its PDRID and the detected energies on the other peer discovery resources corresponding to other PDRIDs.

Figure 8:
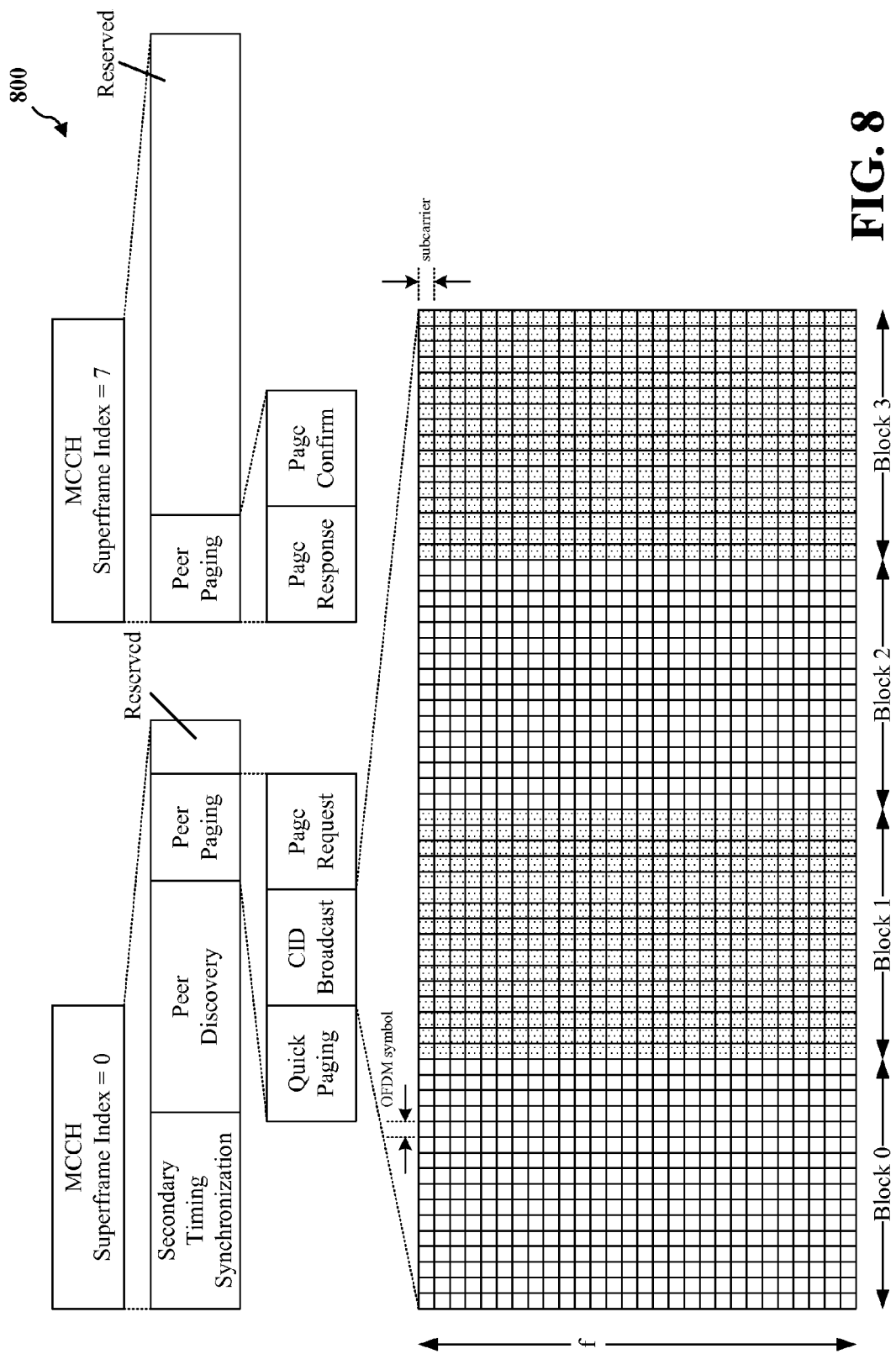
FIG. 8 is a diagram illustrating an operation timeline of a miscellaneous channel and a structure of a connection identifier broadcast.

FIG. 8 is a diagram 800 illustrating an operation timeline of the MCCH and a structure of a connection identifier (CID) broadcast. As discussed in relation to FIG. 6, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless device evidence that its link connection with a communication peer still exists.

The structure of the CID broadcast consists of four blocks, each of which contains a plurality of resource elements, i.e., a plurality of subcarriers in the frequency domain and OFDM symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

Figure 9:
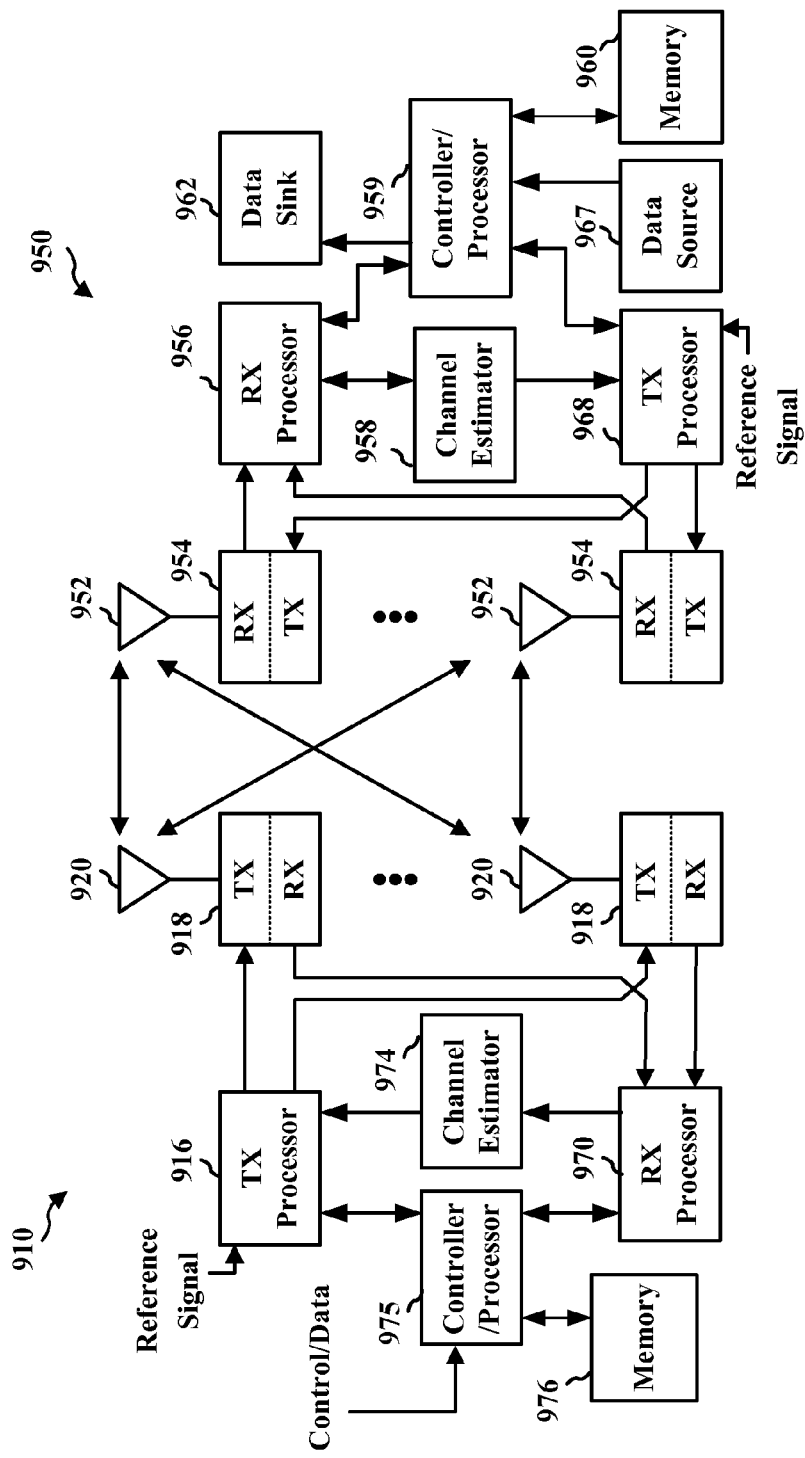
FIG. 9 is a diagram illustrating an example of an evolved Node B and user equipment in an access network.

FIG. 9 is a block diagram of an eNB 910 in communication with a UE 950 in an access network. In the DL, upper layer packets from the core network are provided to a controller/processor 975. The controller/processor 975 implements the functionality of the L2 layer. In the DL, the controller/processor 975 provides header compression, ciphering, packet segmentation and reordering, multiplexing between logical and transport channels, and radio resource allocations to the UE 950 based on various priority metrics. The controller/processor 975 is also responsible for HARQ operations, retransmission of lost packets, and signaling to the UE 950.

The transmit (TX) processor 916 implements various signal processing functions for the L1 layer (i.e., physical layer). The signal processing functions includes coding and interleaving to facilitate forward error correction (FEC) at the UE 950 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream is then provided to a different antenna 920 via a separate transmitter 918TX. Each transmitter 918TX modulates an RF carrier with a respective spatial stream for transmission.

At the UE 950, each receiver 954RX receives a signal through its respective antenna 952. Each receiver 954RX recovers information modulated onto an RF carrier and provides the information to the receive (RX) processor 956. The RX processor 956 implements various signal processing functions of the L1 layer. The RX processor 956 performs spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 910. These soft decisions may be based on channel estimates computed by the channel estimator 958. The soft decisions are then decoded and deinterleaved to recover the data and control signals that were originally transmitted by the eNB 910 on the physical channel. The data and control signals are then provided to the controller/processor 959.

The controller/processor 959 implements the L2 layer. The controller/processor can be associated with a memory 960 that stores program codes and data. The memory 960 may be referred to as a computer-readable medium. In the UL, the control/processor 959 provides demultiplexing between transport and logical channels, packet reassembly, deciphering, header decompression, control signal processing to recover upper layer packets from the core network. The upper layer packets are then provided to a data sink 962, which represents all the protocol layers above the L2 layer. Various control signals may also be provided to the data sink 962 for L3 processing. The controller/processor 959 is also responsible for error detection using an acknowledgement (ACK) and/or negative acknowledgement (NACK) protocol to support HARQ operations.

In the UL, a data source 967 is used to provide upper layer packets to the controller/processor 959. The data source 967 represents all protocol layers above the L2 layer. Similar to the functionality described in connection with the DL transmission by the eNB 910, the controller/processor 959 implements the L2 layer for the user plane and the control plane by providing header compression, ciphering, packet segmentation and reordering, and multiplexing between logical and transport channels based on radio resource allocations by the eNB 910. The controller/processor 959 is also responsible for HARQ operations, retransmission of lost packets, and signaling to the eNB 910.

Channel estimates derived by a channel estimator 958 from a reference signal or feedback transmitted by the eNB 910 may be used by the TX processor 968 to select the appropriate coding and modulation schemes, and to facilitate spatial processing. The spatial streams generated by the TX processor 968 are provided to different antenna 952 via separate transmitters 954TX. Each transmitter 954TX modulates an RF carrier with a respective spatial stream for transmission.

The UL transmission is processed at the eNB 910 in a manner similar to that described in connection with the receiver function at the UE 950. Each receiver 918RX receives a signal through its respective antenna 920. Each receiver 918RX recovers information modulated onto an RF carrier and provides the information to a RX processor 970. The RX processor 970 may implement the L1 layer.

The controller/processor 975 implements the L2 layer. The controller/processor 975 can be associated with a memory 976 that stores program codes and data. The memory 976 may be referred to as a computer-readable medium. In the UL, the control/processor 975 provides demultiplexing between transport and logical channels, packet reassembly, deciphering, header decompression, control signal processing to recover upper layer packets from the UE 950. Upper layer packets from the controller/processor 975 may be provided to the core network. The controller/processor 975 is also responsible for error detection using an ACK and/or NACK protocol to support HARQ operations.

Figure 10:
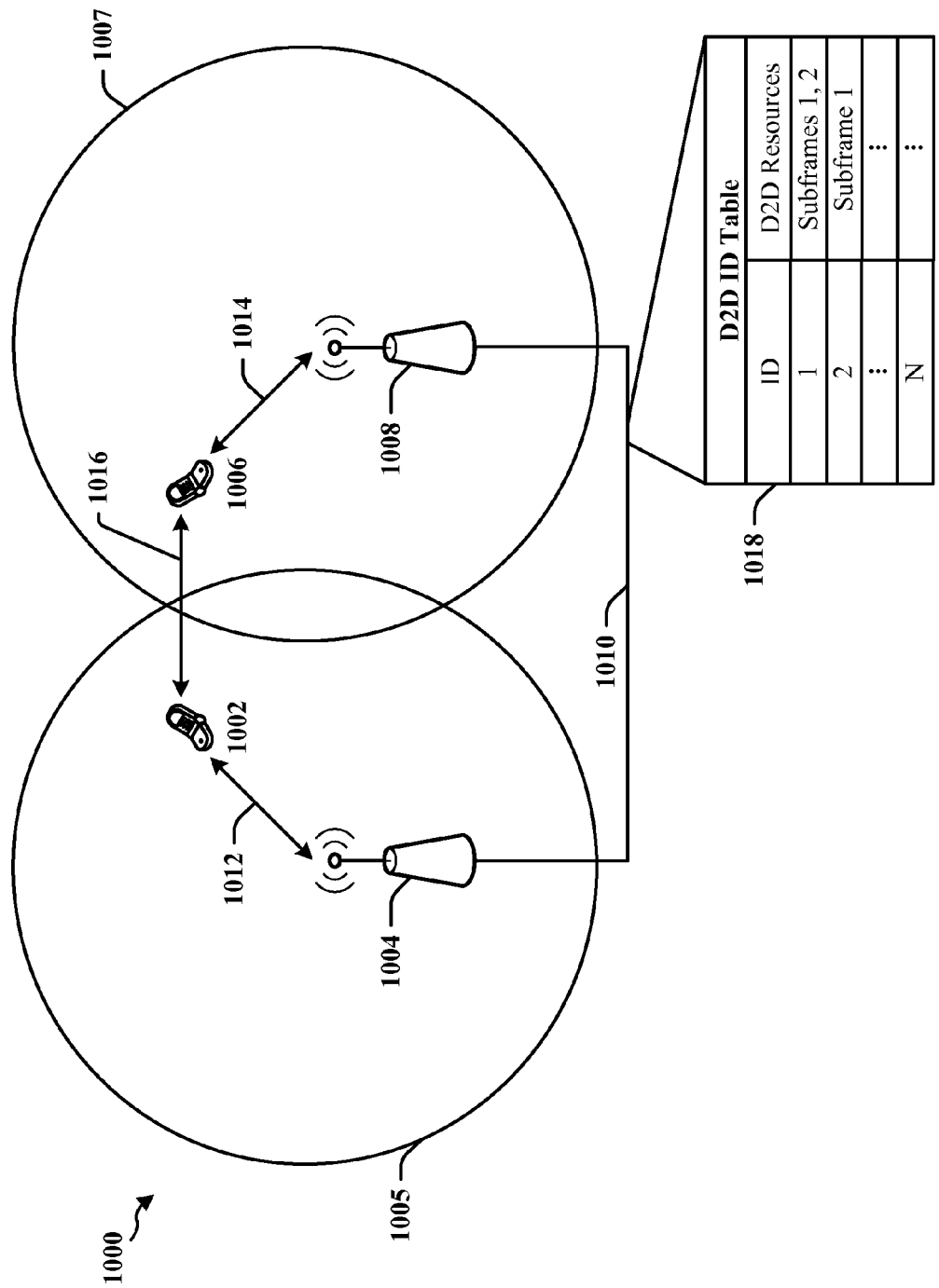
FIG. 10 is a diagram illustrating an example of an access network in which D2D communications may be performed according to an aspect.

FIG. 10 is a diagram 1000 illustrating a wireless communications environment operable to support cellular communications and peer to peer communications.

A wireless communications network 1000 may include a plurality UEs (1002, 1006), and a plurality of eNBs (1004, 1008). The UEs (1002, 1006) may be associated with different eNBs (1004, 1008) and the eNBs (1004, 1008) may be associated with different cells (1005, 1007). In the depicted aspect, UE(1) 1002 is associated with eNB(1) 1004 in a first cell 1005 and UE(2) 1006 is associated with eNB(2) 1008 in a second cell 1007. As such, system 1000 allows for signaling 1012 between UE(1) 1002 and eNB(1) 1004, and signaling 1014 between UE(2) 1006 and eNB(2) 1008. Further, UEs (102, 1006) may be operable to communicate directly with each other using resources 1016 allocated for device to device (D2D) communications. Devices in neighboring cells (1005, 1007) may be allocated different sets of resources for D2D communication. For D2D communication to be enabled, a device, say UE(1) 1002, may determine a set of resources are available for communications with another device, say UE(2) 1006.

In operation, UE(1) 1002 receive a control signal 1012 indicating a set of resources allocated for D2D communications by eNB(1) 1004. The eNB(1) 1004 may determine the set of resources based on one or more network factors. In one aspect, the one or more network factors may include, but are not limited to, a number of D2D devices in a cell, an energy level detected on D2D subframes in the cell, a type of traffic carried in D2D communications in the cell, a number of D2D devices in a neighbor cell, an energy level detected on D2D subframes in the neighbor cell, a type of traffic carried in D2D communications in the neighboring cell, D2D resources allocated in the neighboring cell, a number of collisions reported by UEs within the cell, a number of collisions reported by UE within the neighbor cell, a relative importance value between D2D and WAN traffic for the cell, a relative importance value between D2D and WAN traffic for the neighbor cell, congestion on a WAN, etc. In one aspect, the eNB(1) 1004 may receive at least a portion of the one or more network factors and/or the set of resources allocated for D2D communications by the eNB(2) 1008 over an X2 interface 1010 with the eNB(2) 1008. In one aspect, the resources may be conveyed efficiently using a table 1018, as follows: the set of resource allocations for D2D are numbered 1, . . . , N, and the resource are numbered 1, . . . , M (e.g., N<2^M if all resource combinations are not allowed). For each value of 1, . . . N, the eNB may inform the UE what subset of resources 1, . . . , M (E.g., subframes 1 and 2, subframe 1, etc.) can be used. Thus there may be N tables 1018, each of size <=M.

Further, UE(1) may receive a signal 1016 indicating a set of resources allocated for D2D communications by eNB(2) 1004 from UE(2) 1006. UE(1) 1002 may determine a subset of resources that may be used for D2D communications 1016 and may signal 1012 the subset of resources to eNB(1) 1004.

Thereafter, UE(1) 1002 may receive signaling 1012 from eNB (1) 1004 an identifier indicating scheduling of the agreed upon resources for D2D communications using a shared channel and UE(1) 1002 and UE(2) 1006 may engage in D2D communications using the agreed upon resources.

Figure 11:
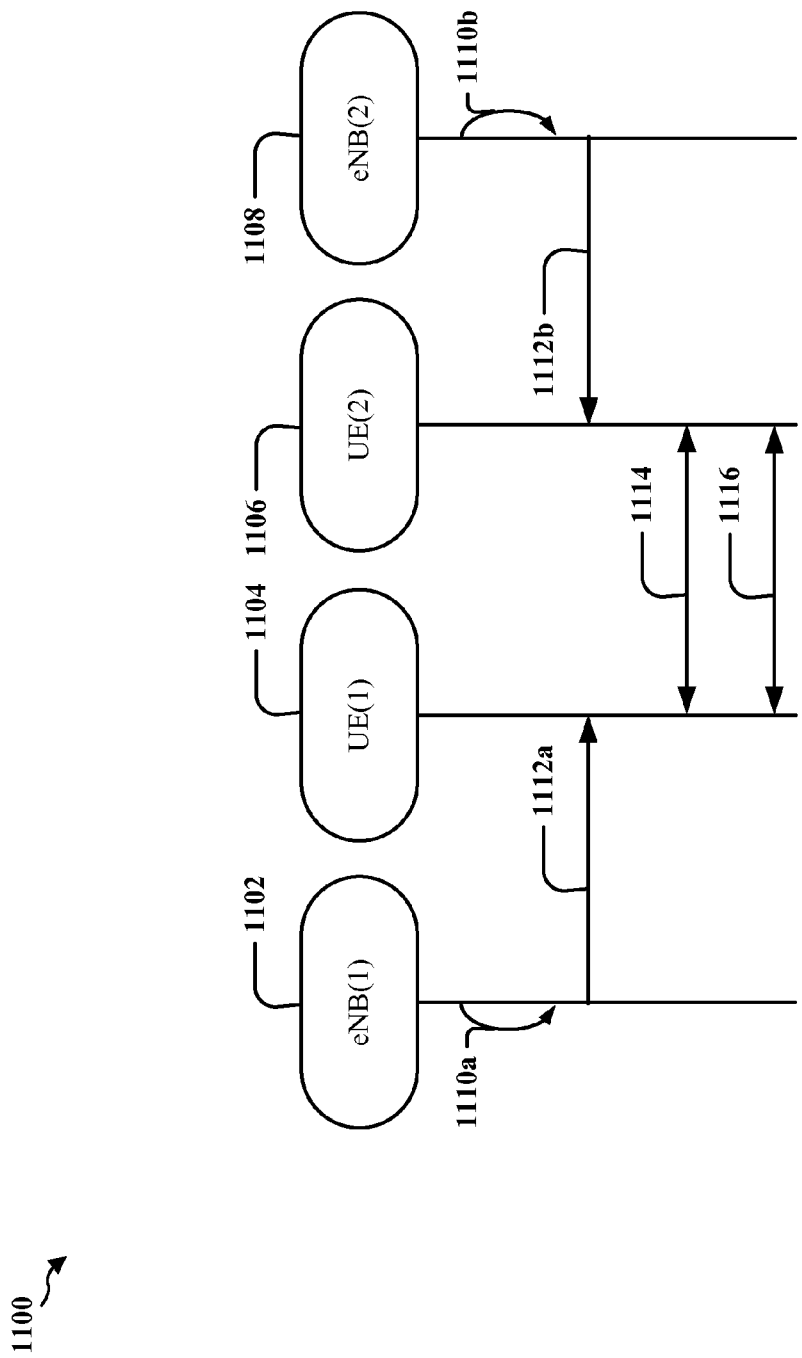
FIG. 11 is a call flow diagram of a communications an access network according to an aspect.

FIG. 11 illustrates an example call flow diagram of a wireless communications system 1100 that is operable to enable a UE to determine available resources for D2D Communication between a pair of devices.

At acts 1110*a* and 1110*b*, eNBs (1102, 1108) determine a number of resources to allocate for D2D communications. In one aspect, this determination may be based on analysis of any combination of, a number of D2D devices in a cell, an energy level detected on D2D subframes in the cell, a type of traffic carried in D2D communications in the cell, a number of D2D devices in a neighbor cell, an energy level detected on D2D subframes in the neighbor cell, a type of traffic carried in D2D communications in the neighboring cell, D2D resources allocated in the neighboring cell, a number of collisions reported by UEs within the cell, a number of collisions reported by UE within the neighbor cell, a relative importance value between D2D and WAN traffic for the cell, a relative importance value between D2D and WAN traffic for the neighbor cell, congestion on a WAN, etc.

At acts 1112*a* and 1112*b*, the eNBs (1102, 1108) transmit control signaling including the information indicating the resources allocated for D2D communications. In one aspect, the control signaling may be transmitted using radio resource control (RRC) signals. In another aspect, the information is indicated using a system information block (SIB). In one aspect, each eNB (1102, 1108) may broadcasts (via RRC signaling) to the UEs within the cell upon which resources the UEs may contend to communicate with other UEs. For example, the resources may be conveyed efficiently as follows: the set of resource allocations for D2D are numbered 1, . . . , N, and the resource are numbered 1, . . . , M (e.g., $N<2^M$ if all resource combinations are not allowed). For each value of 1, . . . N, the eNB may inform the UE what subset of resources 1, . . . , M it can use. Thus there may be N tables, each of size <=M. In addition or in the alternative, if a UE broadcasts its local cell ID, then UE(1) 1104 may determine which resources it can contend for data transmission to UE(2) 1106 based on the cell ID of UE(2) 1106. Thus, a serving eNB may broadcast (via RRC messages, carried over SIBs), a table which maps local cell ID to subset of 1, . . . , M resources that can be used for D2D communication.

At act 1114, the UEs (1104, 1106) determine a set of resources for D2D communications based on one or more D2D resource determination schemes. One D2D resource determination scheme includes exchanging bit pattern information. Such a scheme may be beneficial when the neighboring D2D enabled devices of a UE can belong to different cells with different allocations for D2D communication. Here, the n bit pattern may be exchanged between two devices when one device pages the other device. This scheme may be advantageous when the neighboring D2D enabled devices of a UE can belong to different cells with different allocations for D2D communication. This can happen when small cells (e.g., pico, femto, micro) are deployed, such as in urban settings. A second D2D resource determination scheme includes partitioning of the discovery space into portions. In such a scheme, each portion may correspond to a different pattern of resource allocation for D2D communication. The mapping from a portion to a resource pattern can be signaled to a UE by the eNB via RRC signaling at act 1112*a*,1112*b*. This mapping maybe coordinated between eNBs (1102, 1108) via X2 signaling. The number of such portions into which the peer discovery channel may be divided may be relatively small since resources allocated for D2D communication typically do not change abruptly across neighboring cells. A third D2D resource determination scheme includes defining a "local" cell identifier (e.g., a three bit sequence) that can be broadcast by a device during a peer discovery message (e.g., act 1112*a*, 1112*b*). The serving eNB broadcasts (in a RRC message), a mapping from cell ID to resources that a device may use for D2D communications.

At act 1116, the UEs (1104, 1106) may receive, using a control channel, an identifier indicating scheduling of the agreed upon resources for D2D communications using a shared channel. In one aspect, the control channel is a physical downlink control channel (PDCH), the identifier is a radio network temporary identifier (RNTI), and the shared channel is a physical downlink shared channel (PDSCH). In one aspect, scheduling or resources for D2D communications may be based on any one of: a set of common resources available for D2D communication between the two devices, a set of D2D resource allocation in neighboring cells of the eNB(1) 102 and the eNB(2) 108, interference levels on different resources, etc.

Figure 12:
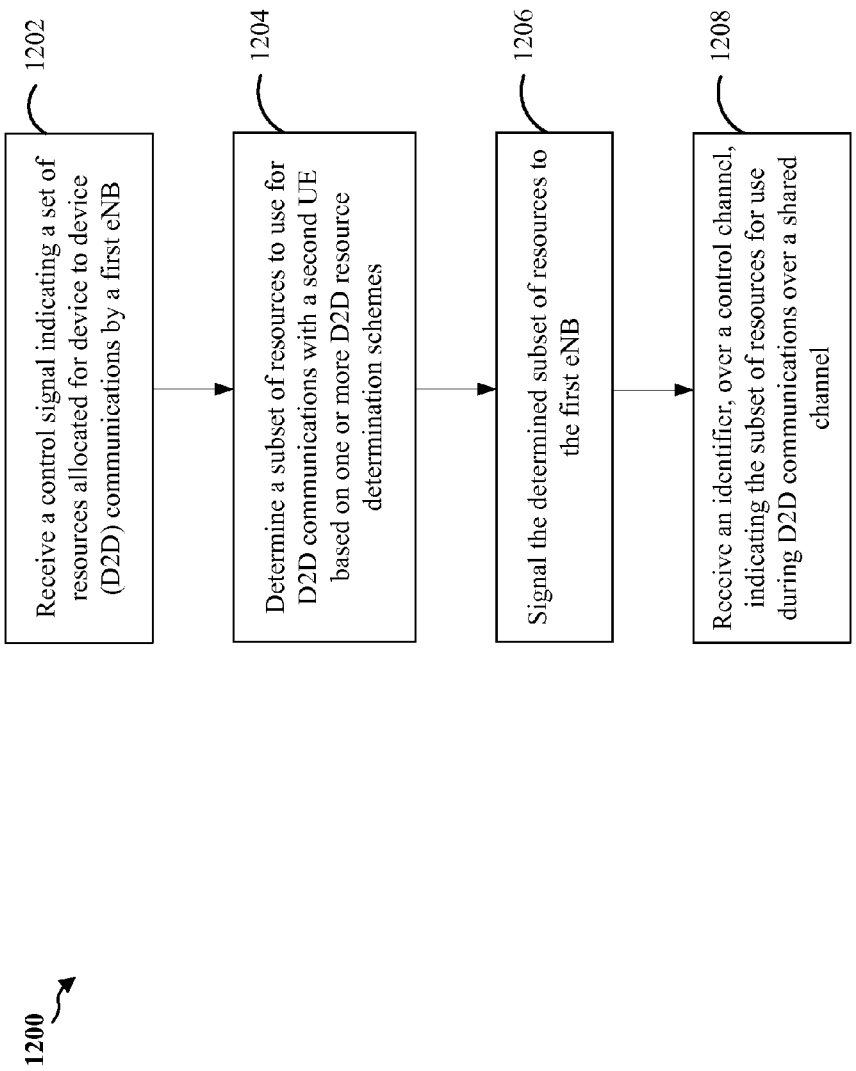
FIG. 12 is a flow chart of a method of wireless communication.

FIG. 12 is a flow chart 1200 of a method of wireless communication. The method may be performed by a wireless device.

At block 1202, the wireless device may receive a control signal indicating a number of resources allocated for D2D communications by an eNB. In one aspect, the control signal may be a radio resource control (RRC) signal. In one aspect, a set of resources may be allocated in a system information block (SIB).

At block 1204, the wireless device may determine a subset of resources to use for D2D communications with a second UE based on one or more D2D resource determination schemes. In one aspect, at least a portion of a set of resources allocated for D2D communications by a second eNB for use by the second UE may be different than the set of resources allocated for D2D communications by the first eNB. In one aspect, the D2D resource determination scheme may include exchanging bit pattern information between the first and second UEs. In such an aspect, the first UE may page the second UE to exchange the bit pattern information. In another aspect, the D2D resource determination scheme may include receiving information partitioning a discovery space into portions along with a mapping of different resource pattern allocations for different portions. In such an aspect, the wireless device may broadcast the peer discovery signal in one of the discovery space portions based on the received control signal indicating the set of resources allocated for D2D communications by the first eNB. In another aspect, the D2D resource determination scheme may include receiving a cell identifier with the number of resources allocated for D2D communications and a mapping of the cell identifiers to a set of resources available for D2D communications. In such an aspect, the wireless device may schedule D2D communications based on the received cell identifier.

At block 1206, the wireless device may signal the determined subset of resources to the first eNB. In one aspect, the subset of resources is determined based on a set of D2D resource allocations in a neighboring cell, interference levels on one or more identified resources, etc.

At block 1208, the wireless device may receive an identifier, over a control channel, indicating the subset of resources for use during D2D communications over a shared channel. In other words, the resource allocation may be received via a control channel and content may be communicated between devices using a shared channel.

Figure 13:
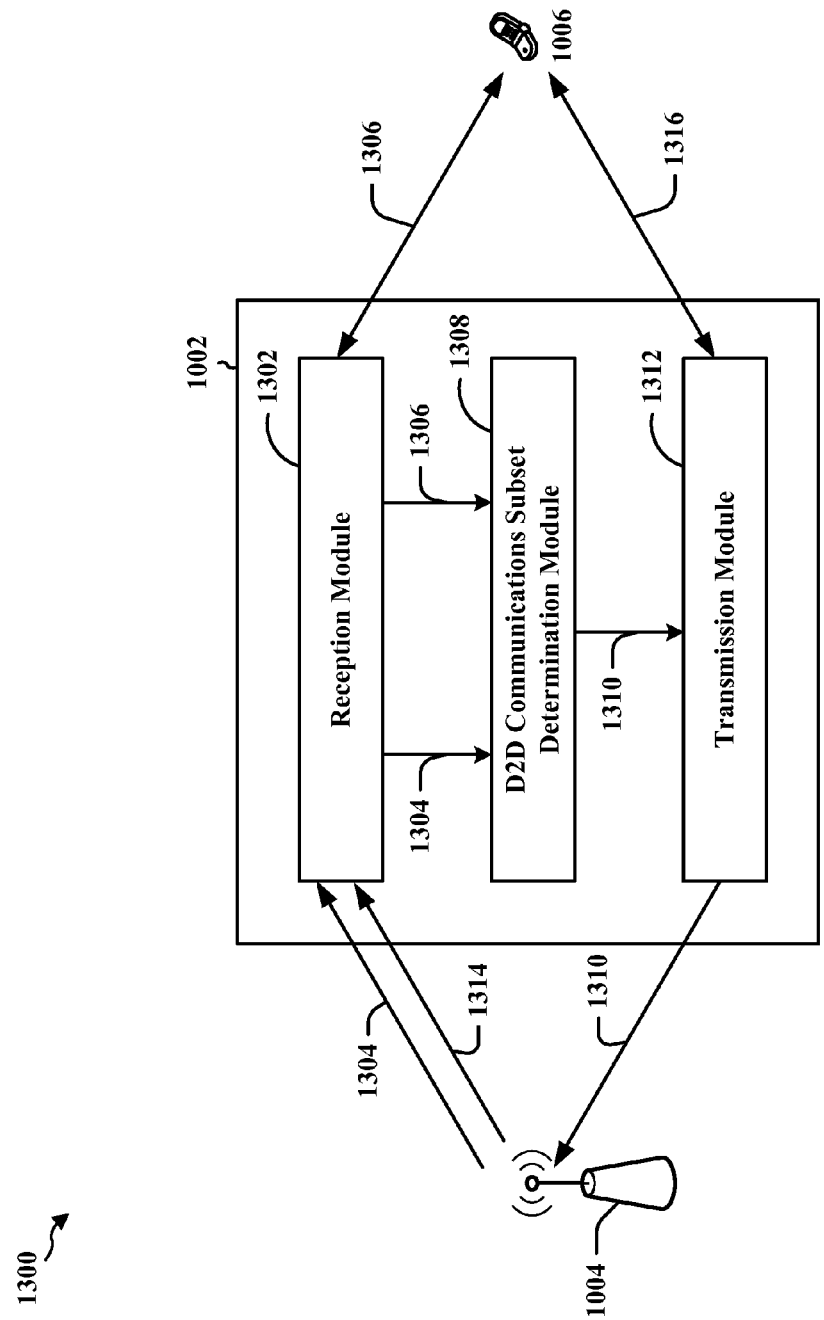
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 102. The apparatus 102 includes a reception module 1302 that may receive a control signal indicating a set of resources 1304 allocated for D2D communications by a first eNB 1004. Further, reception module 1302 may receive a message indicating a set of resource 1306 allocated for D2D communication for use by a second UE 1006 supported by a second eNB (e.g., 1008). In one aspect, at least a portion of the set of resources 1306 allocated for D2D communications by the second eNB 1008 for use by the second UE 1006 are different than the set of resources 1304 allocated for D2D communications for use by the first UE 1002. In one aspect, the set of resource 1304 allocated for D2D communications for use by the first UE 1002 may be received using RRC signaling.

Apparatus 102 further includes D2D communication subset determination module 1308 that may be operable to determine a subset of resources 1310 to use for D2D communications with a second UE based on one or more D2D resource determination schemes. In one aspect, D2D communication subset determination module 1308 that may be operable to exchange bit pattern information between the first and second UEs. In such an aspect, the first UE may page the second UE to exchange the bit pattern information. In another aspect, D2D communication subset determination module 1308 that may be operable to receive information partitioning a discovery space into portions along with a mapping of different resource pattern allocations for different portions. In such an aspect, the wireless device 1002 may broadcast the peer discovery signal in one of the discovery space portions based on the received control signal indicating the set of resources allocated for D2D communications by the first eNB. In another aspect, D2D communication subset determination module 1308 that may be operable to receive a cell identifier with the number of resources allocated for D2D communications and a mapping of the cell identifiers to a set of resources available for D2D communications. In such an aspect, the wireless device 1002 may schedule D2D communications based on the received cell identifier.

Apparatus further includes transmission module 1312 that is operable to signal the determined subset of resource 1310 to the first eNB 1004. Thereafter, the reception module 1302 may be operable to receive an identifier 1314 indicating the subset of resource for use during D2D communications. Further, apparatus 1302 may use the identified resources to perform D2D communications 1316 using a shared channel with the second UE 1006.

The apparatus may include additional modules that perform each of the steps of the algorithm in the aforementioned flow charts FIGS. 11 and 13. As such, each step in the aforementioned flow charts FIGS. 11 and 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
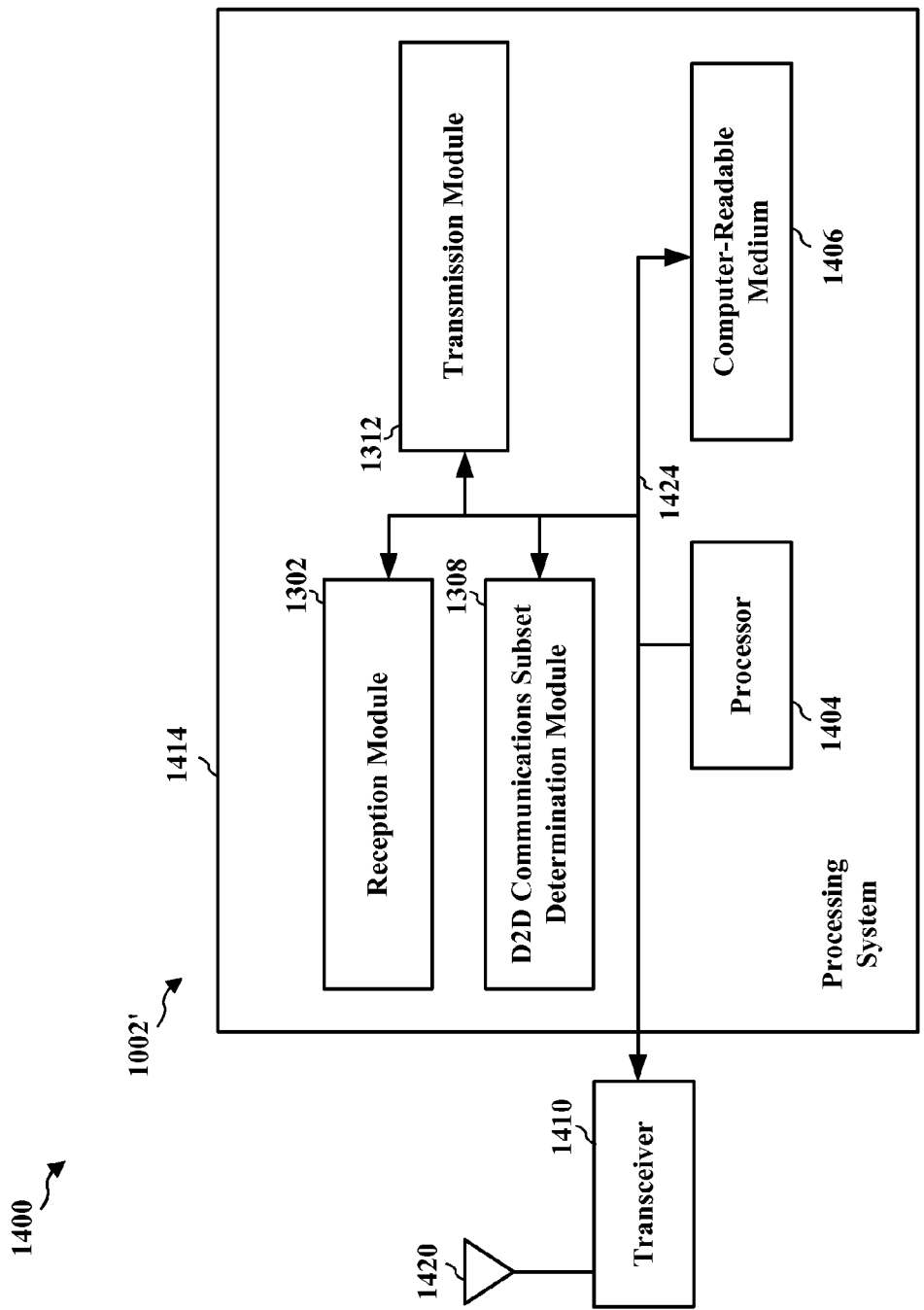
FIG. 14 is a diagram illustrating an example of a hardware implementation for an apparatus employing a processing system.

FIG. 14 is a diagram illustrating an example of a hardware implementation for an apparatus 102' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1302, 1308, 1312, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1302, 1308, and 1312. The modules may be software modules running in the processor 1404, resident/stored in the computer readable medium 1406, one or more hardware modules coupled to the processor 1404, or some combination thereof.

In one configuration, the apparatus 102/102' for wireless communication includes means for receiving, by a first UE, a control signal indicating a set of resources allocated for D2D communications by a first eNB, means for determining a subset of resources to use for D2D communications with a second UE based on one or more D2D resource determination schemes, means for signaling the determined subset of resources to the first eNB, and means for receiving an identifier, over a control channel, indicating the subset of resources for use during D2D communications over a shared channel. In one aspect, at least a portion of a set of resources allocated for D2D communications by a second eNB for use by the second UE are different than the set of resources allocated for D2D communications by the first eNB. The apparatus 102/102' for wireless communication may further include means for exchanging bit pattern information between the first UE and a second UE where the first UE may page the second UE as part of a D2D communications scheme. The apparatus 102/102' for wireless communication may further include means for receiving information partitioning a discovery space into portions, and means for receiving a mapping of different patterns of resource allocation for D2D communication to different portions as part of a D2D communications scheme. The apparatus 102/102' for wireless communication may further include means for receiving a cell identifier with the number of resources allocated for D2D communications, and means for receiving a mapping of the cell identifier to a set of resources available for D2D communications as part of a D2D communications scheme. In such an aspect, the apparatus 102/102' for wireless communication may further include means for scheduling the D2D communications based on the received cell identifier.

The aforementioned means may be one or more of the aforementioned modules of the apparatus 102 and/or the processing system 1414 of the apparatus 102' configured to perform the functions recited by the aforementioned means.

Figure 15:
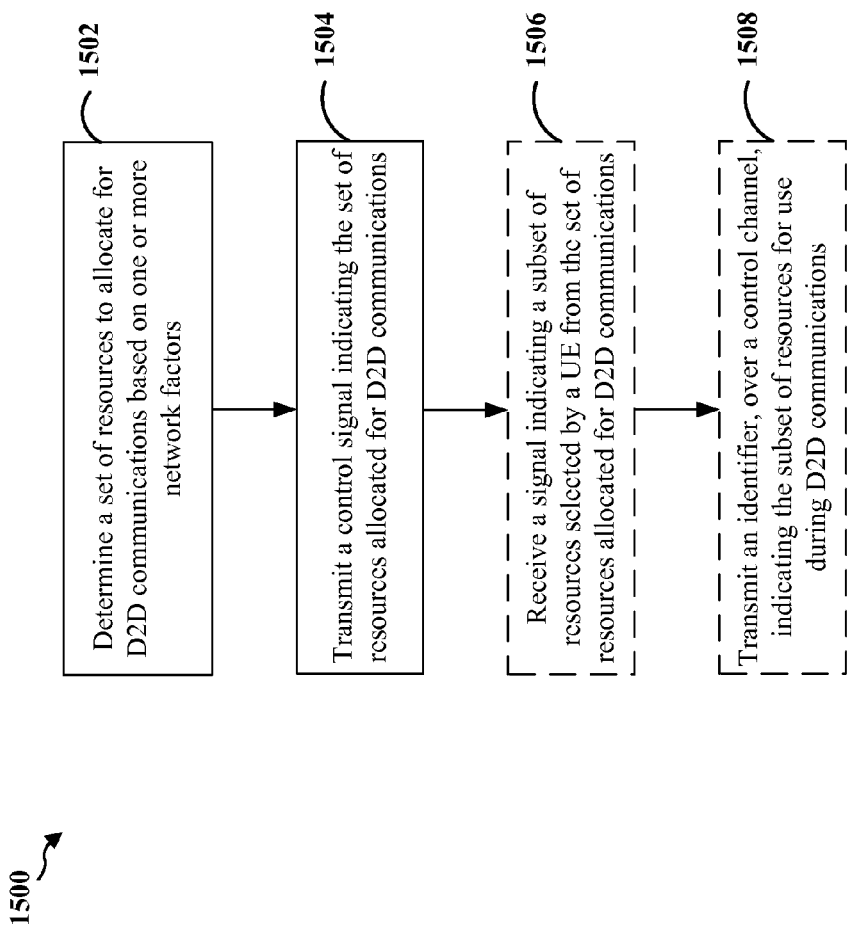
FIG. 15 is a flow chart of a method of wireless communication.

FIG. 15 is a flow chart 1500 of a method of wireless communication. The method may be performed by an evolved Node-B (eNB).

At block 1502, the eNB may determine a set of resources to allocate for D2D communications based on one or more network factors. In one aspect, at least a portion of a set of resources allocated for D2D communications by a second eNB are different than the set of resources allocated for D2D communications by the first eNB. In one aspect, the one or more network factors may include, but are not limited to, a number of D2D devices in a cell, an energy level detected on D2D subframes in the cell, a type of traffic carried in D2D communications in the cell, a number of D2D devices in a neighbor cell, an energy level detected on D2D subframes in the neighbor cell, a type of traffic carried in D2D communications in the neighboring cell, D2D resources allocated in the neighboring cell, a number of collisions reported by UEs within the cell, a number of collisions reported by UE within the neighbor cell, a relative importance value between D2D and WAN traffic for the cell, a relative importance value between D2D and WAN traffic for the neighbor cell, congestion on a WAN, etc. In one aspect, a preference order for one or more subsets or resources to be used for D2D communications may be determined for a set of resources allocated for D2D communications by the second eNB.

At block 1504, the eNB may transmit a control signal indicating the set of resources allocated for D2D communications. In one aspect, a preference order for one or more subsets or resources allocated for D2D communications by the second eNB may be included in the transmission. In another aspect, a table including a mapping of a local cell ID to the preference order may be included in the transmission.

In an optional aspect, at block 1506, the eNB may receive a signal indicating a subset of resources selected by a UE from the set of resources allocated for D2D communications.

Figure 16:
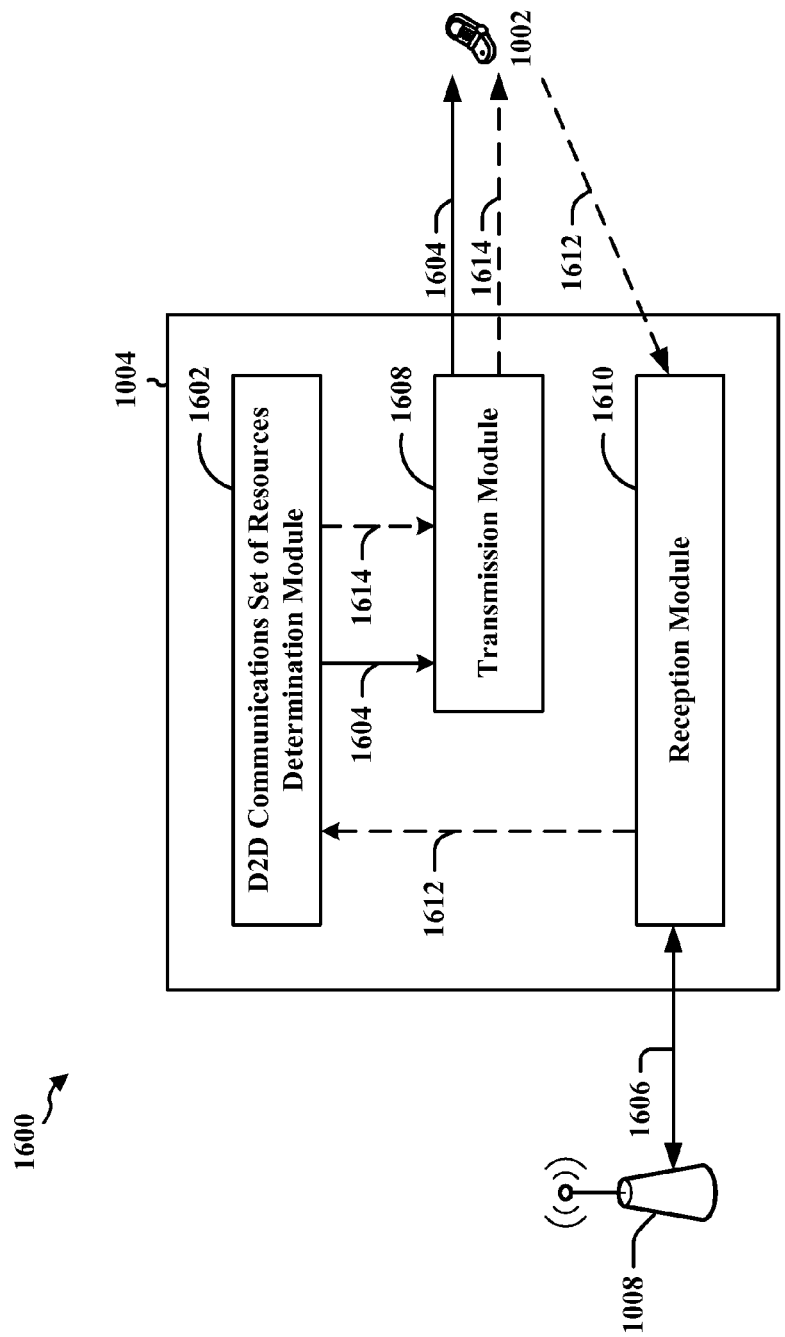
FIG. 16 is a conceptual data flow diagram illustrating the data flow between different modules/means/components in an exemplary apparatus.

In an optional aspect, at block 1508, the eNB may transmit an identifier, over a control channel, indicating the subset of resources for use during D2D communications FIG. 16 is a conceptual data flow diagram 1600 illustrating the data flow between different modules/means/components in an exemplary apparatus 104. The apparatus 104 includes a D2D communications set of resources determination module 1602 that is operable to determine a set of resources 1604 to allocate for D2D communications based on one or more network factors. In one aspect, at least a portion of a set of resources 1606 allocated for D2D communications by a second eNB are different than the set of resources 1604 allocated for D2D communications by the first eNB. In one aspect, the one or more network factors may include, but are not limited to, a number of D2D devices in a cell, an energy level detected on D2D subframes in the cell, a type of traffic carried in D2D communications in the cell, a number of D2D devices in a neighbor cell, an energy level detected on D2D subframes in the neighbor cell, a type of traffic carried in D2D communications in the neighboring cell, D2D resources allocated in the neighboring cell, a number of collisions reported by UEs within the cell, a number of collisions reported by UE within the neighbor cell, a relative importance value between D2D and WAN traffic for the cell, a relative importance value between D2D and WAN traffic for the neighbor cell, congestion on a WAN, etc. In one aspect, the apparatus 104 may receive at least a portion of the one or more network factors and the set of resources allocated for D2D communications by the second eNB over an X2 interface with the second eNB.

The apparatus further includes a transmission module 1608 that is operable to transmit a control signal indicating the set of resources 1604 allocated for D2D communications to a UE 1002. In one aspect, a preference order for one or more subsets or resources 1604 allocated for D2D communications by the second eNB 1008 may be included in the transmission. In another aspect, a table including a mapping of a local cell ID to the preference order may be included in the transmission.

The apparatus may further include a reception module 1610. In an optional aspect, reception module 1610 may receive a signal indicating a subset of resources 1610 selected by a UE 1002 from the set of resources allocated for D2D communications 1604. Further, in the optional aspect, D2D communications set of resources determination module 1602 may analyze the received subset of resources 1612 and allocate a subset of resources 1614 for use by the UE 1002 for D2D communications. Still further, in the optional aspect, transmission module 1608 may transmit the allocated subset of resources 1614 to the UE 1002.

The apparatus may include additional modules that perform each of the steps of the algorithm in the aforementioned flow chart FIGS. 11 and 15. As such, each step in the aforementioned flow chart FIGS. 11 and 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
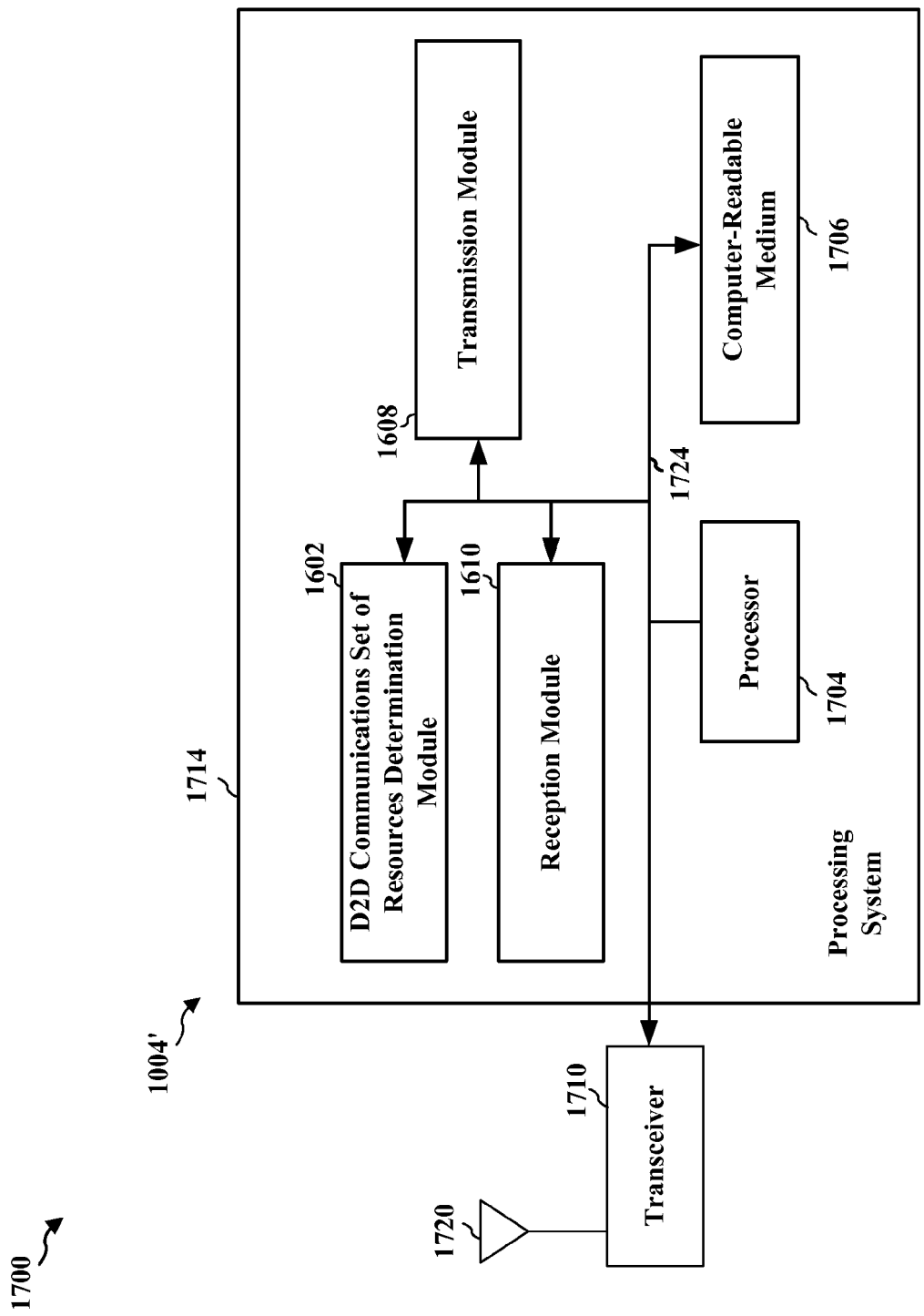
FIG. 17 is a diagram illustrating an example of a hardware implementation for an apparatus employing a processing system.

FIG. 17 is a diagram illustrating an example of a hardware implementation for an apparatus 104' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1602, 1608, 1610, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1602, 1608, and 1610. The modules may be software modules running in the processor 1704, resident/stored in the computer readable medium 1706, one or more hardware modules coupled to the processor 1704, or some combination thereof.

In one configuration, the apparatus 104/104' for wireless communication includes means for determining a set of resources to allocate for D2D communications based on one or more network factors, and means for transmitting a control signal indicating the set of resources allocated for D2D communications. In one aspect, at least a portion of a set of resources allocated for D2D communications by a second eNB are different than the set of resources allocated for D2D communications by the first eNB. Apparatus 104/104' may include means for receiving at least a portion of the one or more network factors and the set of resources allocated for D2D communications by the second eNB over an X2 interface with the second eNB. In one aspect, apparatus 104/104' may include means for determining, for a set of resources allocated for D2D communications by the second eNB, a preference order for one or more subsets of resources to be used for D2D communications, and means for transmitting the preference order of the one or more subsets of resources. In such an aspect, apparatus 104/104' may include means for transmitting a table which maps a local cell ID to the preference order. In one aspect, apparatus 104/104' may include means for receiving a signal indicating a subset of resources selected by a UE from the set of resources allocated for D2D communications, and means for transmitting an identifier, over a control channel, indicating the subset of resources for use during D2D communications.

The aforementioned means may be one or more of the aforementioned modules of the apparatus 104 and/or the processing system 1714 of the apparatus 104' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications by a first user equipment (UE), comprising:
   receiving a control signal indicating a set of resources allocated for device to device (D2D) communications by a first evolved Node B (eNB);
   determining a subset of resources to use for D2D communications with a second UE based on one or more D2D resource determination schemes, wherein at least a portion of a set of resources allocated for D2D communications by a second eNB for use by the second UE are different than the set of resources allocated for D2D communications by the first eNB;
   signaling the determined subset of resources to use for D2D communications to the first eNB; and
   receiving an identifier, over a control channel, indicating the subset of resources for use during D2D communications over a shared channel.

2. The method of claim 1, wherein the control signal comprises a radio resource control signal.

3. The method of claim 1, wherein the set of resources allocated for D2D communications is indicated in a system information block (SIB).

4. The method of claim 1, wherein one of the one or more D2D resource determination schemes comprises exchanging bit pattern information between the first UE and the second UE, wherein the first UE pages the second UE.

5. The method of claim 1, wherein one of the one or more D2D resource determination schemes comprises:
   receiving information partitioning a discovery space into portions; and
   receiving a mapping of different patterns of resource allocation for D2D communication to different portions.

6. The method of claim 5, further comprising:
   broadcasting a peer discovery signal in one of the discovery space portions based on the received control signal indicating the set of resources allocated for D2D communications by the first eNB.

7. The method of claim 1, wherein one of the one or more D2D resource determination schemes comprises:
   receiving a cell identifier with the number of resources allocated for D2D communications; and
   receiving a mapping of the cell identifier to a set of resources available for D2D communications.

8. The method of claim 7, further comprising:
   scheduling the D2D communications based on the received cell identifier.

9. The method of claim 1, wherein the subset of resources is determined based on at least one of:
   a set of D2D resource allocations in a neighboring cell; or
   interference levels on one or more identified resources.

10. An apparatus for wireless communication, the apparatus being a first user equipment (UE), comprising:
    means for receiving a control signal indicating a set of resources allocated for device to device (D2D) communications by a first evolved Node B (eNB);
    means for determining a subset of resources to use for D2D communications with a second UE based on one or more D2D resource determination schemes, wherein at least a portion of a set of resources allocated for D2D communications by a second eNB for use by the second UE are different than the set of resources allocated for D2D communications by the first eNB;
    means for signaling the determined subset of resources to use for D2D communications to the first eNB; and
    means for receiving an identifier, over a control channel, indicating the subset of resources for use during D2D communications over a shared channel.

11. The apparatus of claim 10, wherein the control signal comprises a radio resource control signal.

12. The apparatus of claim 10, wherein the set of resources allocated for D2D communications is indicated in a system information block (SIB).

13. The apparatus of claim 10, wherein the means for determining the subset of resources to use for D2D communications with the second UE based on the one or more D2D resource determination schemes is configured to exchange bit pattern information between the first UE and the second UE, wherein the first UE pages the second UE.

14. The apparatus of claim 10, wherein the means for determining the subset of resources to use for D2D communications with the second UE based on the one or more D2D resource determination schemes is configured to:
    receive information partitioning a discovery space into portions; and
    receive a mapping of different patterns of resource allocation for D2D communication to different portions.

15. The apparatus of claim 14, further comprising:
    means for broadcasting a peer discovery signal in one of the discovery space portions based on the received control signal indicating the set of resources allocated for D2D communications by the first eNB.

16. The apparatus of claim 10, wherein the means for determining the subset of resources to use for D2D communications with the second UE based on the one or more D2D resource determination schemes is configured to:
    receive a cell identifier with the number of resources allocated for D2D communications; and
    receive a mapping of the cell identifier to a set of resources available for D2D communications.

17. The apparatus of claim 16, further comprising:
    means for scheduling the D2D communications based on the received cell identifier.

18. The apparatus of claim 10, wherein the subset of resources is determined based on at least one of:
  a set of D2D resource allocations in a neighboring cell; or
  interference levels on one or more identified resources.

19. A non-transitory computer-readable medium associated with a first user equipment (UE) and storing computer executable code for wireless communication, comprising code for:
  receiving a control signal indicating a set of resources allocated for device to device (D2D) communications by a first evolved Node B (eNB);
  determining a subset of resources to use for D2D communications with a second UE based on one or more D2D resource determination schemes, wherein at least a portion of a set of resources allocated for D2D communications by a second eNB for use by the second UE are different than the set of resources allocated for D2D communications by the first eNB;
  signaling the determined subset of resources to use for D2D communications to the first eNB; and
  receiving an identifier, over a control channel, indicating the subset of resources for use during D2D communications over a shared channel.

20. The non-transitory computer-readable medium of claim 19, wherein the control signal comprises a radio resource control signal.

21. The non-transitory computer-readable medium of claim 19, wherein the set of resources allocated for D2D communications is indicated in a system information block (SIB).

22. The non-transitory computer-readable medium of claim 19, wherein the determining the subset of resources to use for D2D communications with the second UE based on the one or more D2D resource determination schemes comprises exchanging bit pattern information between the first UE and the second UE, wherein the first UE pages the second UE.

23. The non-transitory computer-readable medium of claim 19, wherein the determining the subset of resources to use for D2D communications with the second UE based on the one or more D2D resource determination schemes comprises:
  receiving information partitioning a discovery space into portions; and
  receiving a mapping of different patterns of resource allocation for D2D communication to different portions.

24. The non-transitory computer-readable medium of claim 23, further comprising code for:
  broadcasting a peer discovery signal in one of the discovery space portions based on the received control signal indicating the set of resources allocated for D2D communications by the first eNB.

25. The non-transitory computer-readable medium of claim 19, wherein the determining the subset of resources to use for D2D communications with the second UE based on the one or more D2D resource determination schemes comprises code for:
  receiving a cell identifier with the number of resources allocated for D2D communications; and
  receiving a mapping of the cell identifier to a set of resources available for D2D communications.

26. The non-transitory computer-readable medium of claim 25, further comprising code for:
  scheduling the D2D communications based on the received cell identifier.

27. The non-transitory computer-readable medium of claim 19, wherein the subset of resources is determined based on at least one of:
  a set of D2D resource allocations in a neighboring cell; or
  interference levels on one or more identified resources.

28. An apparatus for wireless communication, the apparatus being a first user equipment (UE), comprising:
  a processing system configured to:
    receive a control signal indicating a set of resources allocated for device to device (D2D) communications by a first evolved Node B (eNB);
    determine a subset of resources to use for D2D communications with a second UE based on one or more D2D resource determination schemes, wherein at least a portion of a set of resources allocated for D2D communications by a second eNB for use by the second UE are different than the set of resources allocated for D2D communications by the first eNB;
    signal the determined subset of resources to use for D2D communications to the first eNB; and
    receive an identifier, over a control channel, indicating the subset of resources for use during D2D communications over a shared channel.

29. The apparatus of claim 28, wherein the control signal comprises a radio resource control signal.

30. The apparatus of claim 28, wherein the set of resources allocated for D2D communications is indicated in a system information block (SIB).

31. The apparatus of claim 28, wherein the processing system is further configured to exchange bit pattern information between the first UE and the second UE, wherein the first UE pages the second UE.

32. The apparatus of claim 28, wherein the processing system is further configured to:
  receive information partitioning a discovery space into portions; and
  receive a mapping of different patterns of resource allocation for D2D communication to different portions.

33. The apparatus of claim 32, wherein the processing system is further configured to:
  broadcast a peer discovery signal in one of the discovery space portions based on the received control signal indicating the set of resources allocated for D2D communications by the first eNB.

34. The apparatus of claim 28, wherein the processing system is further configured to:
  receive a cell identifier with the number of resources allocated for D2D communications; and
  receive a mapping of the cell identifier to a set of resources available for D2D communications.

35. The apparatus of claim 34, wherein the processing system is further configured to:
  schedule the D2D communications based on the received cell identifier.

36. The apparatus of claim 28, wherein the subset of resources is determined based on at least one of:
  a set of D2D resource allocations in a neighboring cell; or
  interference levels on one or more identified resources.

* * * * *